No. 653,848. Patented July 17, 1900.
J. W. SHEPPARD.
CONDUIT FOR MOLTEN GLASS.
(Application filed Oct. 13, 1899.)
(No Model.)
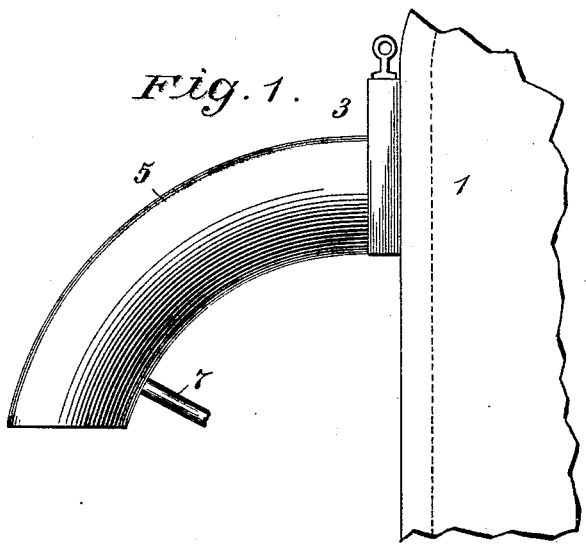
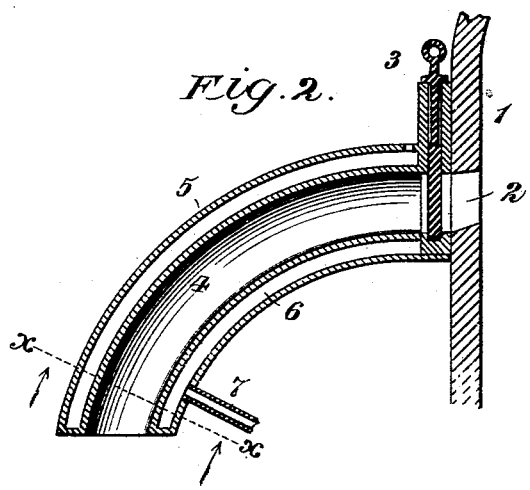
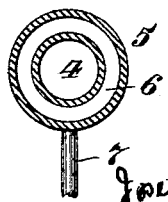
Witnesses
Edward Rowland
Lester L. Sisson
Joseph W. Sheppard Inventor
By his Attorney A. M. Pierce

UNITED STATES PATENT OFFICE.

JOSEPH W. SHEPPARD, OF NEW YORK, N. Y.

CONDUIT FOR MOLTEN GLASS.

SPECIFICATION forming part of Letters Patent No. 653,848, dated July 17, 1900.

Application filed October 13, 1899. Serial No. 733,466. (No model.)

*To all whom it may concern:*

Be it known that I, JOSEPH W. SHEPPARD, a citizen of the United States, residing in the city, county, and State of New York, have invented a new and useful Improvement in Conduits for Molten Glass, of which the following is a specification.

My invention relates especially to the manufacture of glass, and has for its object the provision of a device for use in connection with the melting chamber, vat, or furnace whereby I obtain economy of labor, ease of handling the molten glass, a better product, and little or no loss by reason of the imperfections which now so often deface and spoil the product, but which by my invention are entirely obliterated.

To attain the desired end, my invention consists, essentially, in the combination, with the glass-melting chamber, vat, furnace, or other source of supply of molten glass, of a heated conduit from a discharge-opening in the source of supply of molten glass and in certain novel and useful combinations or arrangements of parts and pecularities of construction and operation, all of which will be hereinafter first fully described and then pointed out in the claim.

In the accompanying drawings, forming a part hereof, Figure 1 is a side elevation of the front portion of a glass-melting vat or furnace with my conduit connected therewith. Fig. 2 is a longitudinal vertical sectional view through the conduit, and Fig. 3 is a cross-sectional view at line *x x* of Fig. 2.

Similar numerals of reference wherever they occur indicate corresponding parts in all the figures.

My invention pertains to the manipulation of glass while in its molten state, and has for its object the easier, more economical, and effective handling of the molten mass between the time of its being brought to a proper condition for use while in the melting-chamber and its reaching the mold or table, where it is proposed to form it into permanent shape; but to show the advantages my invention possesses over all existing methods of handling glass in its molten condition I will briefly review the present state of the art of glass-making as far as it pertains to the manipulation of the molten mass between the melting-chamber and the table or mold where it is pressed into permanent form and show the results therefrom. I will also show the advantages my invention possesses over all other existing methods as to ease in handling the molten mass, economy in labor, and the superiority of the product that comes therefrom, whereby a proper appreciation of my invention is made possible not only in the minds of those skilled in the art to which my invention relates, but also in the minds of those observers who may be interested in the subject.

The common method now employed for handling molten glass for the hereinafter-mentioned specific purpose is to carry the mass in metal dippers from the melting chamber or pot to the rolling-table, where it is rolled into the desired thickness by metal rollers adjusted to the table upon which the molten mass of glass has been dumped. This method is employed to produce the plain or figured sheet-glass, skylight-glass, &c., common in all markets.

Owing to the fact that the aura of air around the dipper, which is of necessity cooler than the molten glass, does not become rarefied and disperse quickly enough before it dips the glass out of the melting chamber or pot, the air coming in contact with the glass is more or less taken up by it and later on shows itself in the finished product in the form of bubbles, which greatly lessen the value of the glass, or it may be that these strata of air will produce what is termed "lappy glass," which I will hereinafter describe, but which will materially reduce the value of the product. Therefore another method of handling the molten glass has been devised with the object of avoiding the enumerated defects and, if possible, to produce always and at all times and under all conditions of the atmosphere sheets of glass with less or none of the imperfections described, and in the endeavor to accomplish this desired result and improve upon the before-described method machinery is employed to lift the pot containing the molten glass from the furnace and carry it to the rolling-table, where it is dumped and then rolled to the desired thickness of sheet, as before described. By this method the thicker sheets of glass are produced and also those sheets that after annealing are polished, making what is known as "plate-glass."

It will thus be seen that in the methods above described there is not only much labor necessarily employed in bringing the molten glass from the melting-chamber to the point where it is to be manipulated into permanent form, but unfortunately the results are far from being satisfactory, as the product contains more or less of the imperfections described; but by my improved method and invention I am enabled to dispense with the labor used in carrying the molten mass, thereby in that one item alone greatly reducing the cost of the product and withal producing a greatly-improved article of commerce, with few, if any, of the blemishes that deface the product of the methods now in use.

Owing to the fact that glass when in a molten condition is very sensitive to the cooler strata of the air which surrounds it after it has been taken from the melting chamber or pot and as this cooler air so quickly sets or hardens the surface of the glass, forming skins or films, it has heretofore been deemed practically impossible to take the molten glass from the melting-chamber as molten iron is taken from the furnace, for the reason that these skins or films which so quickly form on the surface of the mass caused by the lower temperature of air or material surrounding the molten glass make what the trade terms "lappy glass"—that is, the sheet of glass made from a dump that had these skins or films shows irregular ridges or indentations on the surface, as the case might be—and as the surfaces of the mass so effected are prematurely hardened before the interior of the mass they will not spread out or lose identity under the pressure of the roller, making a clear and even surface, as desired, but will demonstrate their existence in the finished product by showing the defects mentioned, thereby not only depreciating the marketable value of the glass, but often making it entirely unsalable. My invention completely overcomes these obstacles, conducting, as it does, the molten mass of glass to the immediate point of manipulation without the possibility of the molten glass coming in contact with cooler strata of air or cool metal dippers, hence avoiding the very causes that produce so many of the objectionable air-bubbles and also those skins or films that go to make "lappy glass," the veritable bugbear of the glass-maker.

I have shown a simple form of construction as illustrating my invention; but I do not confine myself to the precise arrangement shown, as the mechanical construction and relative arrangement and location of parts may be infinitely varied, as occasion may require, without departing from the spirit of my invention.

In the drawings, 1 is a portion of the front of a melting-chamber or source of supply of melted glass.

2 is an outlet from the source of supply, this outlet being controlled by a lifting or sliding gate 3 or the equivalent.

4 is a conduit made of any approved material, such as fire-clay. 5 is an inclosing casing surrounding said conduit 4, a space 6, forming a combustion-chamber, being left between the conduit 4 and the casing 5.

7 is a gas-pipe leading to the combustion-chamber.

I do not confine myself to the use of gas as a heating medium, as any other means of applying heat to the conduit may be used in carrying my invention into effect.

In operation the glass within the source of supply is melted by the well-known means, and the conduit from the source of supply is heated to substantially the same temperature as the molten glass. The rolling-table, mold, or other manipulating device is brought beneath the mouth of the conduit, and by opening the outlet 2 the molten glass will flow through the heated conduit directly thereto without change of temperature, thus effectually protecting the molten mass from the very causes that make the objectionable air-bubbles, skins, or films before described. When sufficient glass has been allowed to escape, the exit-orifice 2 is closed until the next supply is required.

Having now fully described my invention, what I claim as new therein, and desire to secure by Letters Patent, is—

The combination with a source of supply of molten glass, of an exit-orifice from said source of supply located below the top thereof; means at said orifice for controlling the escape of molten glass; a double-walled conduit leading from said orifice and controlling device, and means for generating heat within the space between the walls of the conduit throughout its entire length.

Signed by me at New York, N. Y., this 11th day of October, 1899.

JOSEPH W. SHEPPARD.

Witnesses:
A. M. PIERCE,
LESTER L. SISSON.